(12) United States Patent
Kim

(10) Patent No.: US 12,227,158 B2
(45) Date of Patent: Feb. 18, 2025

(54) ELECTRONIC PARKING BRAKE SYSTEM AND CONTROL METHOD THEREFOR

(71) Applicant: HL MANDO CORPORATION, Pyeongtaek-si (KR)

(72) Inventor: Wookhyeon Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/772,983

(22) PCT Filed: Oct. 14, 2020

(86) PCT No.: PCT/KR2020/014036
§ 371 (c)(1),
(2) Date: Apr. 28, 2022

(87) PCT Pub. No.: WO2021/085897
PCT Pub. Date: May 6, 2021

(65) Prior Publication Data
US 2024/0149844 A1    May 9, 2024

(30) Foreign Application Priority Data
Oct. 31, 2019   (KR) .................. 10-2019-0137844

(51) Int. Cl.
*B60T 13/74*    (2006.01)
*B60T 8/171*    (2006.01)
(Continued)

(52) U.S. Cl.
CPC ............. *B60T 8/172* (2013.01); *B60T 8/171* (2013.01); *B60T 13/746* (2013.01); *B60T 17/22* (2013.01);
(Continued)

(58) Field of Classification Search
None
See application file for complete search history.

(56) References Cited

U.S. PATENT DOCUMENTS

| | | | |
|---|---|---|---|
| 2006/0261764 A1 | 11/2006 | Erben et al. | |
| 2008/0071456 A1* | 3/2008 | Shiraki | H02P 3/04 188/162 |

(Continued)

FOREIGN PATENT DOCUMENTS

| | | |
|---|---|---|
| JP | 2014-19235 A | 2/2014 |
| KR | 10-2011-0033624 A | 3/2011 |

(Continued)

OTHER PUBLICATIONS

International Search Report issued Feb. 2, 2021, corresponding to International Application No. PCT/KR2020/014036.

*Primary Examiner* — Aniss Chad
*Assistant Examiner* — Madison R. Inserra
(74) *Attorney, Agent, or Firm* — Hauptman Ham, LLP

(57) ABSTRACT

Disclosed herein an electric parking brake (EPB) system including a motor actuator operated by an electric motor includes a motor driving circuit configured to drive the electric motor; a current sensor detecting a current flowing through the electric motor; a voltage sensor detecting a voltage input to the electric motor; and a controller configured to determine a total energy consumption based on the current and voltage of the electric motor during a parking operation, determine whether a target current of a parking operation mode needs to be changed in response to the determined total energy consumption, in response to determining that the target current needs to be changed, change the target current based on at least one of a period of use and the number of times of operation of the EPB system, and control the electric motor in response to the changed target current.

7 Claims, 8 Drawing Sheets

(51) Int. Cl.
  *B60T 8/172* (2006.01)
  *B60T 17/22* (2006.01)
  *F16D 65/18* (2006.01)
  *F16D 121/24* (2012.01)
  *H02P 23/14* (2006.01)
  *B60T 8/17* (2006.01)
  *B60T 8/18* (2006.01)
  *B60T 8/24* (2006.01)

(52) U.S. Cl.
  CPC .............. *F16D 65/18* (2013.01); *H02P 23/14* (2013.01); *F16D 2121/24* (2013.01); *H02P 2205/03* (2013.01)

(56) References Cited

U.S. PATENT DOCUMENTS

| | | | |
|---|---|---|---|
| 2013/0233638 A1* | 9/2013 | Lee | B62D 5/0421 180/444 |
| 2016/0107526 A1* | 4/2016 | Jin | B60L 58/24 307/10.1 |
| 2016/0347299 A1* | 12/2016 | No | B60T 13/746 |
| 2018/0118177 A1* | 5/2018 | No | H02P 7/03 |

FOREIGN PATENT DOCUMENTS

| | | |
|---|---|---|
| KR | 10-2015-0117544 A | 10/2015 |
| KR | 10-1670675 B1 | 10/2016 |
| WO | WO-2020235630 A1 * | 11/2020 |

\* cited by examiner

ELECTRONIC PARKING BRAKE SYSTEM AND CONTROL METHOD THEREFOR

CROSS-REFERENCE TO RELATED APPLICATION

The present application is a national stage filing under 35 U.S.C § 371 of PCT application number PCT/KR2020/014036 filed on Oct. 14, 2020, which is based upon and claims the benefit of priorities to Korean Patent Application No. 10-2019-0137844 filed on Oct. 31, 2019, in the Korean Intellectual Property Office. All of the aforementioned applications are hereby incorporated by reference in their entireties.

TECHNICAL FIELD

The disclosure relates to an electric parking brake system and a method of controlling the same, and more particularly, to an electric parking brake system for controlling operation or release of the electric parking brake and a method of controlling the same.

BACKGROUND ART

In general, an Electric Parking Brake (EPB) system, particularly a Motor-On-Caliper (MoC) type of EPB system, increases torque generated by an electric motor through a reducer to generate a clamping force that is a parking force required by the mechanical structure inside a caliper.

Such EPB systems drive an electric motor to press a piston and, which in turn press a pair of brake pads against a brake disk rotating integrally with a wheel of a vehicle, thereby generating a clamping force by a frictional force between contact surfaces of the brake pads and the brake disk.

EPB systems may drive an electric motor during parking operation, detect current of the driven electric motor, and when the detected current of the motor reaches a target current, determine that the required clamping force is satisfied and terminate control of the parking operation.

However, as the number of uses of a system increases, the time for the motor current to reach the target current may increase compared to the initial of product release due to aging of internal components. Accordingly, the time required to meet a required clamping force may be relatively taken longer or a sufficient clamping force may not be formed, so that braking performance of the system may be deteriorated.

DISCLOSURE

Technical Problem

An aspect of the disclosure is to provide an electric parking brake system capable of preventing deterioration of braking performance due to aging of parts of the system, and a method of controlling the same.

Technical Solution

In accordance with an aspect of the disclosure, an electric parking brake (EPB) system comprising a motor actuator operated by an electric motor includes a motor driving circuit configured to drive the electric motor; a current sensor detecting a current flowing through the electric motor; a voltage sensor detecting a voltage input to the electric motor; and a controller configured to determine a total energy consumption based on the current and voltage of the electric motor during a parking operation, determine whether a target current of a parking operation mode needs to be changed in response to the determined total energy consumption, in response to determining that the target current needs to be changed, change the target current based on at least one of a period of use and the number of times of operation of the EPB system, and control the electric motor in response to the changed target current.

The controller may be further configured to compare the determined total energy consumption with a reference consumption, and determine that the target current of the parking operation mode needs to be changed in response to that the determined total energy consumption is higher than the reference consumption.

The electric parking brake system may further include a counter configured to count the number of times of operation of the EPB system, wherein the controller is further configured to determine that the total number of times of operation from a product launch of the EPB system to the present from the number of times of operation counted through the counter, and change the target current based on the determined total number of times of operation.

The electric parking brake system may further include a timer configured to count a period of use of the EPB system, wherein the controller is further configured to determine the period of use from a product launch of the EPB system to the present from the period of use counted through the timer, and change the target current based on the determined period of use.

The controller may be further configured to increase the target current of the parking operation mode as the period of use or the number of times of operation of the EPB system increases.

In accordance with another aspect of the disclosure, an EPB system comprising a motor actuator operated by an electric motor includes a motor driving circuit configured to drive the electric motor; a current sensor configured to detect a current flowing through the electric motor; a voltage sensor configured to detect a voltage input to the electric motor; a counter configured to count the number of times of operation of the EPB system; a timer configured to count a period of use of the EPB system; and a controller configured to determine a total energy consumption based on the current and voltage of the electric motor during a parking operation, determine whether a target current of a parking operation mode needs to be changed in response to the determined total energy consumption, in response to determining that the target current needs to be changed, increase the target current based on at least one of the period of use and the total number of times of operation from a product launch of the EPB system to the present, and control the electric motor in response to the increased target current.

In accordance with another aspect of the disclosure, a method of controlling an EPB system including a motor actuator operated by an electric motor, the method including detecting a current and voltage of the electric motor during a parking operation; determining a total energy consumption based on the detected current and voltage, and comparing the determined total energy consumption with a reference consumption; determining that the target current of a parking operation mode needs to be changed in response to determining that the total energy consumption is higher than the reference consumption as a result of the comparison; increasing the target current based on at least one of a period of use and the total number of times of operation from a product launch of the EPB system to the present in response to determining that the target current needs to be changed; and controlling the electric motor in response to the increased target current.

The increasing of the target current may include increasing the target current as the total number of times of operation of the EPB system increases or the period of use of the EPB system increases.

Advantageous Effects

According to an aspect of the disclosure, it is possible to prevent deterioration of braking performance due to aging of parts of the system.

MODES OF THE INVENTION

Figure 1:
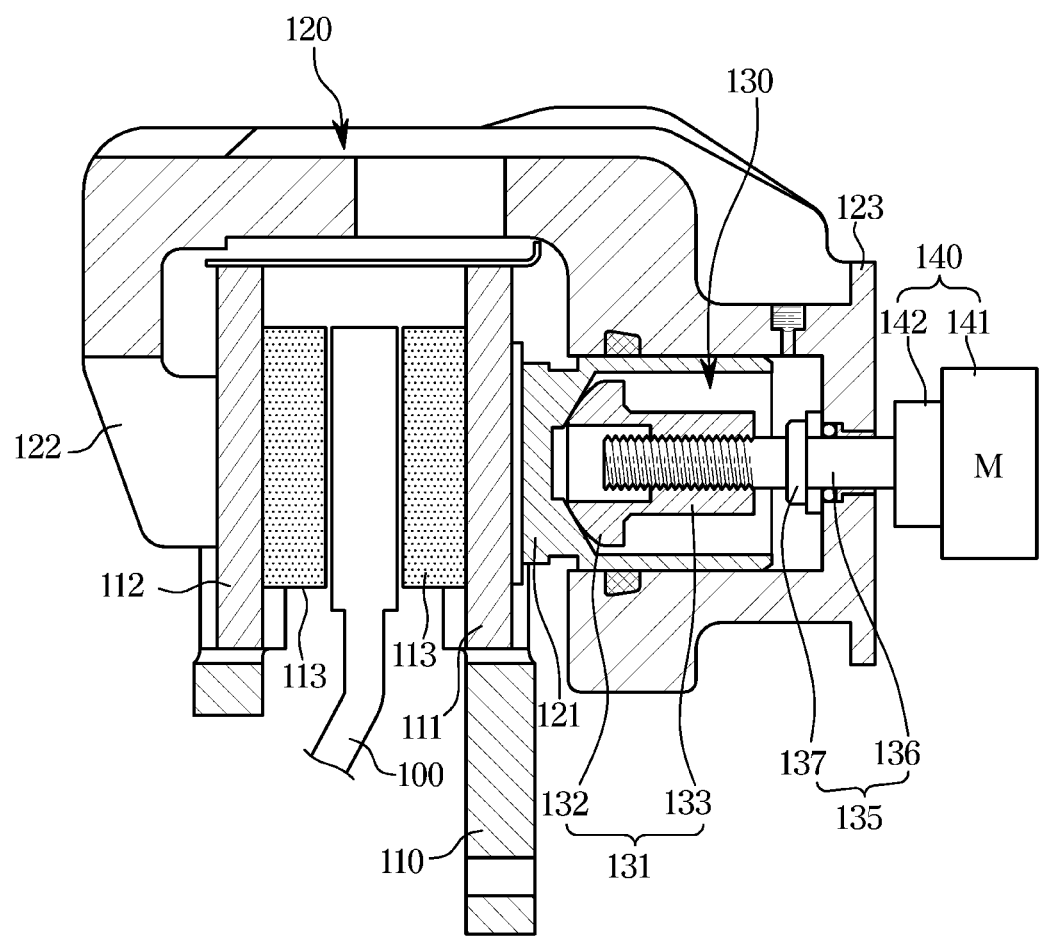
FIG. 1 shows a configuration of an EPB system according to an embodiment of the disclosure.

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~unit", "~group", "~block", "~member", and "~module" used in the specification may be implemented in software or hardware. Terms such as "~unit", "~group", "~block", "~member", and "~module" may refer to a unit that processes at least one function or operation. In addition, terms such as "~unit", "~group", "~block", "~member", and "~module" are used in at least one piece of hardware such as a field-programmable gate array (FPGA)/ application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

FIG. 1 is a view illustrating a configuration of an Electric Parking Brake (EPB) system according to an embodiment of the disclosure.

Referring to FIG. 1, the EPB 10 may include a carrier 110 on which a pair of pad plates 111 and 112 are installed to move forward and backward to press a brake disk 100 rotating together with a wheel of the vehicle, a caliper housing 120 provided with a cylinder 123 slidably installed on the carrier 110 and installed so that a piston 121 may move forward and backward by a braking hydraulic pressure, a power transmission unit 130 that presses the piston 121, and a motor actuator 140 for transmitting a rotational force to the power transmission unit 130 by using a motor M.

The pair of pad plates 111 and 112 may include an inner pad plate 111 disposed in contact with the piston 121 and an outer pad plate 112 disposed in contact with a finger part 122 of the caliper housing 120. The pair of pad plates 111 and 112 are installed on the carrier 110 fixed to a vehicle body so as to move forward and backward toward opposite sides of the brake disc 100. Furthermore, a brake pad 113 is attached to one surface of each of the pad plates 111 and 112 facing the brake disc 100.

The caliper housing 120 is slidably installed on the carrier 110. In particular, the caliper housing 120 includes the cylinder 123 in which the power transmission unit 130 is installed on a rear portion thereof and the piston 121 is embedded so as to move forward and backward, and the finger part 122 bent downward to operate the outer pad plate 112 on a front portion thereof. The finger part 122 and the cylinder 123 are integrally formed.

The piston 121 is provided in a cylindrical with a cup-shaped thereinside and is slidably inserted into the cylinder 123. The piston 121 presses the inner pad plate 111 toward the brake disc 100 by an axial force of the power transmission unit 130 receiving a rotational force of the motor actuator 140. Accordingly, when the axial force of the power transmission unit 130 is applied, the piston 121 advances toward the inner pad plate 111 to press the inner pad plate 111, and the caliper housing 120 operates in a opposite direction to the piston 121 by a reaction force such that the finger part 122 presses the outer pad plate 112 toward the brake disc 100, thereby performing braking operation.

The power transmission unit 130 may serve to receive the rotational force from the motor actuator 140 to press the piston 121 toward the inner pad plate 111.

The power transmission unit 130 may include a nut member 131 that is installed to be disposed inside the piston 121 and is in contact with the piston 121, and a spindle member 135 screwed to the nut member 131.

The nut member 131 may be disposed inside the piston 121 in a state in which rotation thereof is restricted, and may be screw-coupled to the spindle member 135.

The nut member 131 may include a head portion 132 provided to be in contact with the piston 121, and a coupling portion 133 extending from the head portion 132 and having a female thread on an inner circumferential surface so as to be screwed with the spindle member 135.

The nut member 131 moves in a forward direction or a reverse direction according a rotational direction of the spindle member 135 and may serve to press and release the piston 121. In this case, the forward direction may be a movement direction in which the nut member 131 approaches the piston 121. The backward direction may be a movement direction in which the nut member 131 moves away from the piston 121. Furthermore, the forward direction may be a movement direction in which the piston 121 approaches the brake pad 113. The backward direction may be a movement direction in which the piston 121 moves away from the brake pad 113.

The spindle member 135 may include a shaft portion 136 that passes through the rear portion of the caliper housing 120 and rotates by receiving the rotational force of the motor actuator 140, and a flange portion 137 extending radially from the shaft portion 136. One side of the shaft portion 131 may be rotatably installed through a rear side of the cylinder 123, and the other side thereof may be disposed inside the piston 121. At this time, the one side of the shaft portion 131 passing through the cylinder 123 is connected to an output shaft of a reducer 142 to receive the rotational force of the motor actuator 140.

The motor actuator 140 may include an electric motor 141 and a reducer 142.

The electric motor 141 may press and release the piston 121 by rotating the spindle member 135 to move the nut member 131 forward and backward.

The reducer 142 may be provided between an output side of the electric motor 141 and the spindle member 135.

By the above configuration, the EPB 10 moves the nut member 131 by rotating the spindle member 135 in one direction using the motor actuator 140 in a parking operation mode, thereby pressing the piston 121. The piston 121 pressed by the movement of the nut member 131 presses the inner pad plate 111 to bring the brake pad 113 into close contact with the brake disc 100, thereby generating a clamping force.

Furthermore, the EPB 10 rotates the spindle member 135 in the opposite direction using the motor actuator 140 in a parking operation release mode, so that the nut member 131 pressed by the piston 121 moves backward. In other words, the pressure on the piston 121 may be released by the retreat movement of the nut member 131, which causes the clamping force generated by the brake pad 113 being spaced apart from the brake disc 100 to be released.

Figure 2:
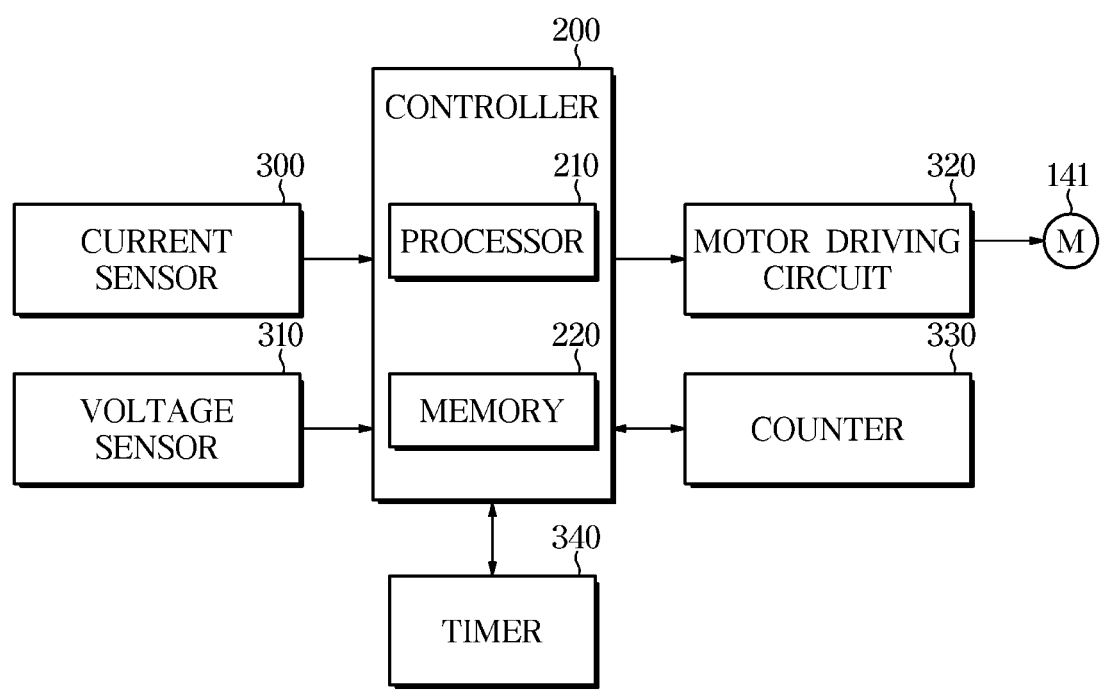
FIG. 2 shows a control block of the EPB system according to an embodiment of the disclosure.

FIG. 2 is a view illustrating a control block of the EPB system according to an embodiment of the disclosure.

Referring to FIG. 2, the EPB system may include a controller 200 that performs overall control related to operation of the EPB 10.

A current sensor 300 and a voltage sensor 310 may be electrically connected to an input side of the controller 200.

A motor driving circuit 320 may be electrically connected to an output side of the controller 200.

A counter 330 and a timer 340 may be electrically connected to the input/output side of the controller 200.

The current sensor 300 may detect a current flowing through the electric motor 141. For example, the current sensor 300 may detect a motor current flowing through the electric motor 141 using a shunt resistor or a Hall sensor. In addition to the shunt resistor or the Hall sensor, various methods for detecting the motor current are applicable to the current sensor 300. The current sensor 300 may transmit detected current information to the controller 200.

The voltage sensor 310 may detect a voltage input to the system or a voltage applied to the electric motor 141. The voltage sensor 310 may transmit detected voltage information to the controller 200.

The motor driving circuit 320 may rotate the electric motor 141 forward or reverse. For example, the motor driving circuit 320 may include an H-bridge circuit including a plurality of power switching elements in order to rotate the electric motor 141 forward and reverse. During the parking operation in which the electric motor 141 rotates in one direction by the motor driving circuit 320, the one-way rotation of the electric motor 141 is decelerated while passing through the reducer 142 to rotate the spindle member 135 in one direction with a large force. When the spindle member 135 rotates in one direction, the axial movement of the nut member 131 may be made. As the nut member 131 presses the piston 121, the pair of the brake pads 113 press the brake disc D, so that the wheel may be braked. The release of parking operation may reversed to the parking actuation.

The counter 330 may count the number of times of operation of the EPB system according to a control signal of the controller 200. The counter 330 may count the number of individual or overall times of operation of the control modes such as the parking operation mode and the parking operation release mode. The counter 330 may count the number of times of operation of the electric motor 141 in the control mode.

The timer 340 may count operating time of the EPB system according to the control signal of the controller 200. The timer 340 may count individual or overall operating times of the control modes such as the parking operation mode and the parking operation release mode. The timer 340 may count the operating times of the electric motor 141 in the control mode.

The controller 200 may be referred to as an Electronic Control Unit (ECU).

The controller 200 may include a processor 210 and a memory 220.

The memory 220 may store a program for processing or controlling the processor 210 and various data for operation of the EPB system.

The memory 220 may include not only volatile memories such as a static random access memory (S-RAM) and a dynamic random-access memory (D-RAM), but also non-volatile memory such as a flash memory, a read-only memory (ROM), an erasable programmable read only memory (EPROM), and the like.

The processor 210 may control the overall operation of the EPB system.

The controller 200 including the above configuration may rotate the electric motor 141 forward or reverse through the motor driving circuit 320.

The controller 200 may perform the parking operation mode or the parking operation release mode in response to operation signals of a parking switch operated by a driver or operation signals generated by a program related to the operation of the EPB.

Figure 3:
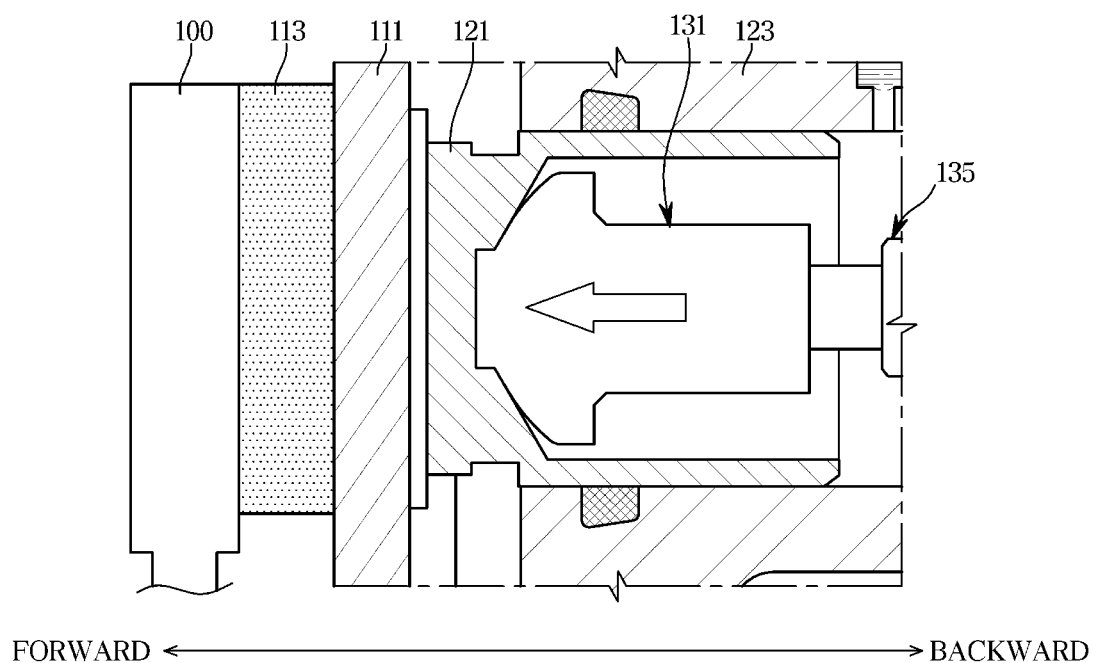
FIG. 3 shows a parking operation mode in the EPB system according to an embodiment of the disclosure.

The controller 200 moves the nut member 131 forward to press the piston 121 by rotating the electric motor 141 in one direction through driving circuit 320 in the parking operation mode, which causes the brake pad 113 to come into close contact with the brake disc 100, thereby performing the parking operation (also referred to as Parking Apply) that generates a parking braking force (see FIG. 3).

Figure 4:
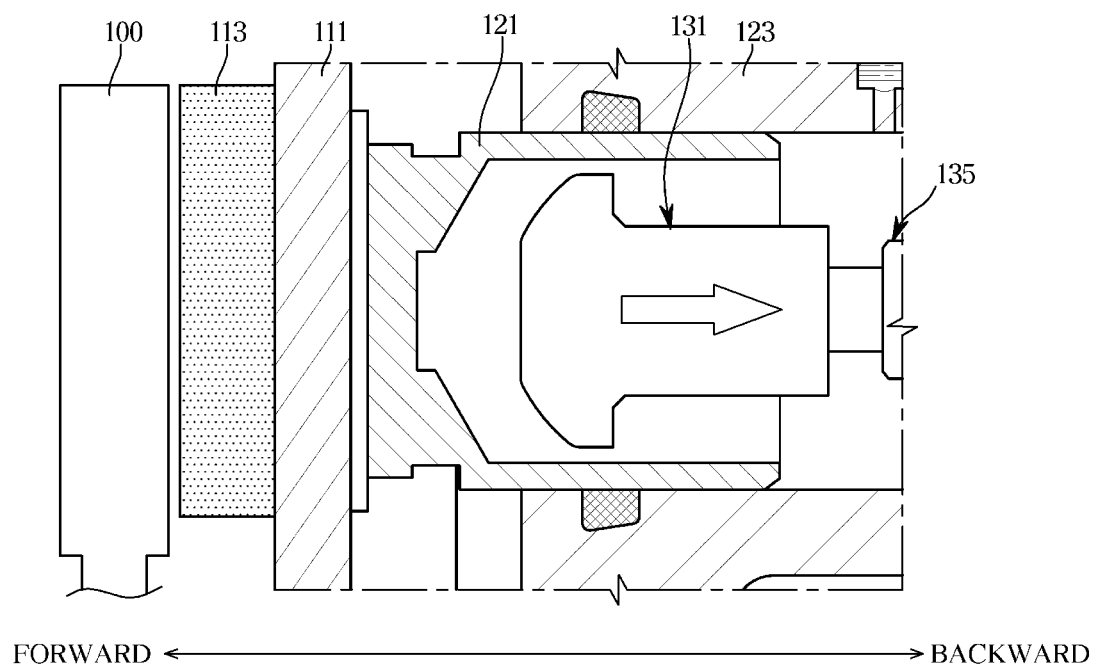
FIG. 4 shows a parking operation release mode in the EPB system according to an embodiment of the disclosure.

The controller 200 moves the nut member 131 backward to release the pressure of the piston 121 by rotating the electric motor 141 in the opposite direction through the motor driving circuit 320 in the parking operation release mode, which causes the brake pad 113 in close contact with the brake disc 100 to release from the brake disc, thereby performing the parking operation release (also referred to as Parking Release) that releases a parking braking force (see FIG. 4).

The controller 200 may determine at least one of the number of times of operation and the operating time of the EPB system from the product launch to the present.

The controller 200 may determine the number of times of operation of the EPB system by counting the number of times of individual or overall operation of the control modes such as the parking operation mode and the parking operation release mode from the product launch of the EPB system to the present through the counter 330.

The controller 200 may determine the operating time of the EPB system by counting the individual or overall operating time of the control modes such as the parking operation mode and the parking operation release mode from the product launch of the EPB system to the present through the timer 340.

Figure 5:
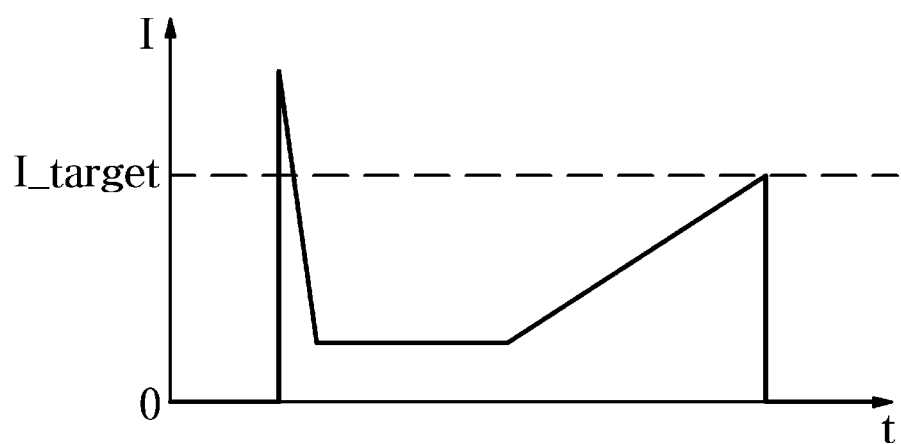
FIG. 5 shows a time change of a motor current during a parking operation in the EPB system according to an embodiment of the disclosure.

The controller 200 moves the nut member 131 forward from a parking operation standby position to a parking operation position during the parking operation. The controller 200 may drive the electric motor 141 to move the nut member 131 in the forward direction, detect a current flowing through the electric motor 141 through the current sensor 300 while the nut member 131 moves in the forward direction after an in-rush filtering section in which inrush current flows in the electric motor 141, and when the detected current value reaches a target current I_target, determine that the nut member 131 has reached the parking operation position and end the parking operation control. When the forward-moved nut member 131 comes into contact with the piston 121 and presses the piston 121, the current flowing through the electric motor 141 rapidly increases. By using the current change, the controller 200 may determine that the nut member 131 has reached the parking operation position (see FIG. 5).

The controller 200 may determine an amount of energy consumed during the parking operation. The controller 200 may determine a total energy consumption based on a motor input energy and gear efficiency. The controller 200 may determine the total energy consumption based on the current and voltage of the electric motor 141.

The controller 200 may compare the total energy consumption accumulated during the parking operation with a reference consumption for determining change of the target current, and in response to that the total energy consumption is higher than the reference consumption, determine that it is necessary to change the target current of the parking operation mode.

The controller 200, in response to determining that the target current of the parking operation mode needs to be changed because the total energy consumption during the parking operation is excessive as a result of the comparison, may change the target current based on the period of use of the system from product launch to the present and/or the number of times of operation of the system from product launch to the present.

The controller 200 may change the target current based on the at least one of the period of use and the number of times of operation of the system.

Because the internal components age as the period of use and the number of times of operation of the system increases, so that the time required for the motor current to reach the target current may also increase. Therefore, the actual parking braking performance may be lowered compared to the parking braking performance when the system is initially released. At this time, because the driving time of the electric motor 141 is increased, the energy consumption may also increase.

Accordingly, the controller 200 compares the total energy consumption with the reference consumption, and in response to that the total energy consumption is higher than the reference consumption, determine that the increasing of the target current of the parking operation mode is required. In other words, the longer the period of use of the system or the greater the number of times of operation of the system, the more the target current of the parking operation mode is increased, so that the parking braking performance may be compensated.

For example, when the period of use of the system is initial, internal components such as gears do not age, so that the motor current may reach an initially set target current within a normal time range during the parking operation. As described above, in the case of that the period of use of the system is the initial, the driving time of the electric motor 141 does not increase, so that the total energy consumption during the parking operation may maintain the reference consumption on product release.

However, when period of use of the system is increased from the initial (or early) to the middle, the internal components are aging. Accordingly, the time it takes for the motor current to reach the initially set target current is longer during the parking operation, and in some cases, the motor current may not reach the target current. As a result, provision of a sufficient clamping force in a timely manner is unavailable, thereby deteriorating parking braking performance. This is even more so if the period of use of the system is extended from middle period to late.

Figure 6:
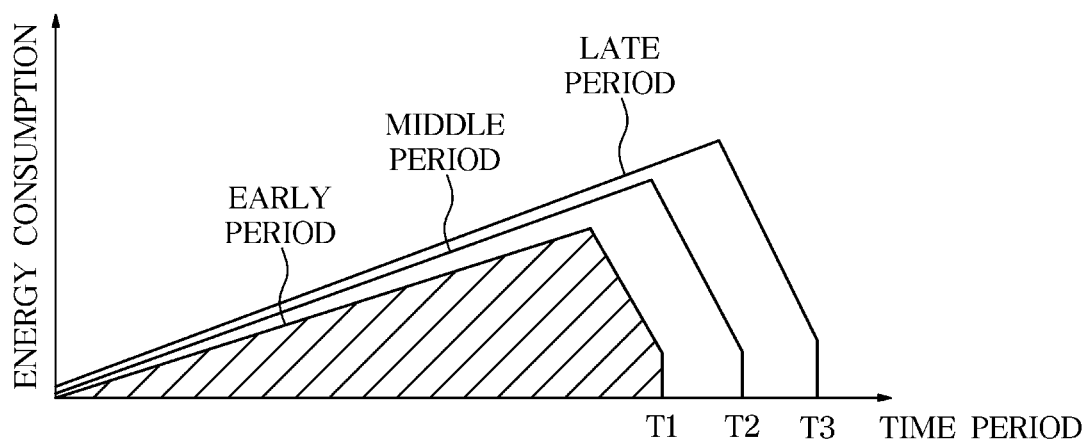
FIG. 6 shows energy consumption for each period of use in the EPB system according to an embodiment of the disclosure.

FIG. 6 is a view illustrating energy consumption for each period of use in the EPB system according to an embodiment of the disclosure.

Referring to FIG. 6, since the aging of the components progresses as the period of use of the system is long or the number of operations thereof is increased, when the driving time of the electric motor 141 is in the middle period rather than the early, and at the late rather than the middle period, the total energy consumption may also increase.

In other words, the total energy consumption may be higher in the middle period than the total energy consumption in the early period of use of the system. Furthermore, the total energy consumption at the late period of use of the system may be higher than the total energy consumption at the middle period.

Figure 7:
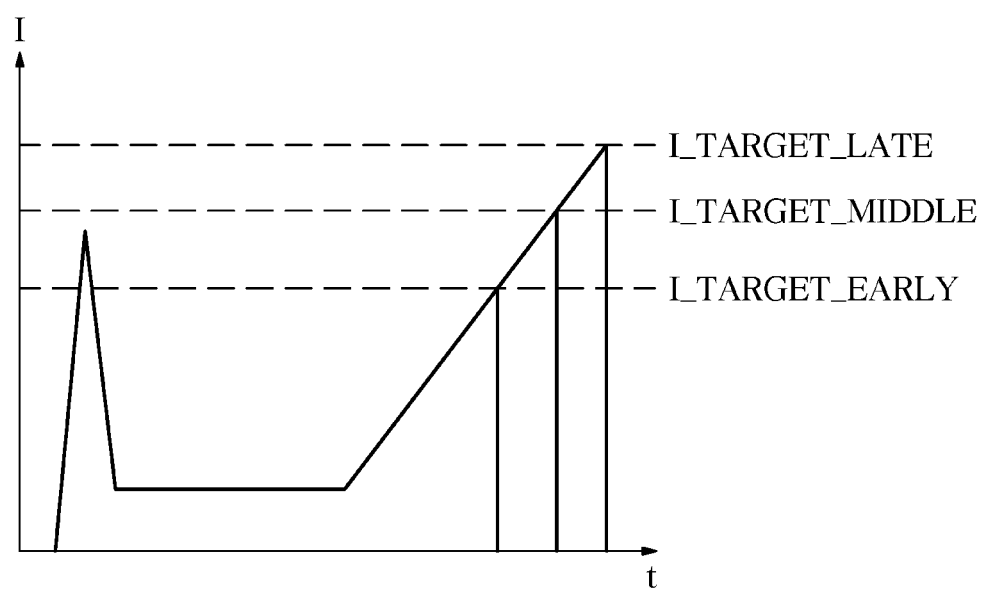
FIG. 7 shows a target current during a parking operation according to an energy consumption for each time period of use in the EPB system according to an embodiment of the disclosure.

FIG. 7 is a view illustrating a target current during a parking operation according to a total energy consumption for each period of use in the EPB system according to an embodiment of the disclosure.

Referring to FIG. 7, a vertical axis represents a motor current I, and a horizontal axis represents a time t.

To generate the same clamping force regardless of the aging of the components, it is necessary to increase the target current at the late when the aging of the components is greater than the early when the aging of the components is less.

In response to determining that it is necessary to change the target current, the target current may be changed to I_target_early in the early, to I_target_middle having a higher current value than I_target_early in the middle, and to I_target_late having a higher current value than I_target_middle in the late.

As such, by appropriately increasing the target current, deterioration of parking braking performance due to the aging of components may be prevented, thereby providing the same parking braking performance.

Figure 8:
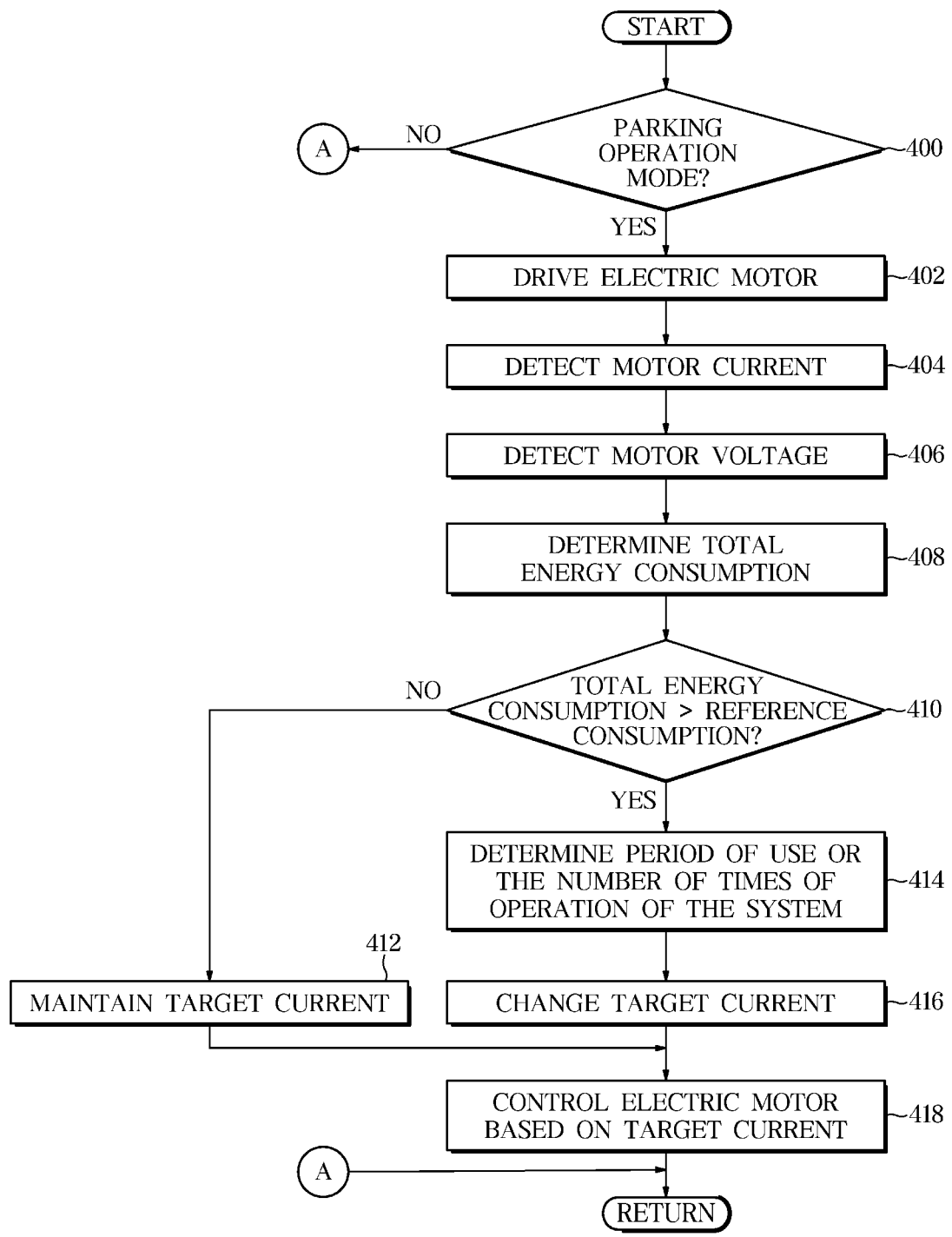
FIG. 8 shows a method of controlling the EPB system according to an embodiment of the disclosure.

FIG. 8 is a view illustrating a method of controlling the EPB system according to an embodiment of the disclosure.

Referring to FIG. 8, the controller 200 determines whether the control mode is the parking operation mode (400).

In response to that the control mode is the parking operation mode, the controller 200 may drive the electric motor 141 through the motor driving circuit 320 (402). As the electric motor 141 starts to rotate, inrush current flows to the electric motor 141 in the in-rush filtering section. After the inrush current flows, a no-load state in which no load is applied to the electric motor 141 is formed until the brake pad 113 comes into contact with the brake disc 100 by the rotation of the electric motor 141. At this time, a current having a constant current value of 0 or more may flow in the electric motor 141 for a certain time.

When the brake pad 113 starts to contact the brake disc 100, the current flowing in the electric motor 141 may also increase in proportion to the size of the load because the load acting on the electric motor 141 gradually increases.

At this time, the controller 200 may detect the current flowing through the electric motor 141 through the current sensor 300 (404).

Furthermore, the controller 200 may detect the voltage input to the electric motor 141 through the voltage sensor 310 (406).

The controller 200 may determine the total energy consumption by accumulating the energy consumption consumed during the parking operation based on the detected motor current and the detected motor voltage (408).

The controller 200 may compare the determined total energy consumption with the reference consumption to determine whether the determined total energy consumption exceeds the reference consumption (410).

If the determined total energy consumption does not exceed the reference consumption as a result of the determination of operation 410, the controller 200 may determine that it is not necessary to change the target current of the parking operation mode, and maintain the target current of the parking operation mode as the current target current (412).

Meanwhile, if the determined total energy consumption exceeds the reference consumption as a result of the determination of operation 410, the controller 200 may determine that it is necessary to change the target current of the parking operation mode, and determine the period of use or the number of times of operation of the system (414). In this case, the controller may determine the period of use from the product launch of the system to the present and/or the number of times of operation of the system from product launch to the present.

The controller 200 may change the target current of the parking operation mode based on the determined period of use or the number of times of operation of the system (416). The longer the period of use or the greater the number of times of operation of the system, the more the target current of the parking operation mode is increased, so that the parking braking performance may be compensated regardless of the aging of internal components.

The controller 200 may control the electric motor 141 in response to a predetermined target current, such as being maintained or changed (418). At this time, when the detected motor current reaches the predetermined target current, the controller 200 may stop the electric motor 141 to terminate the parking operation control.

The invention claimed is:

1. An electric parking brake (EPB) system comprising a motor actuator operated by an electric motor, comprising:
   a motor driving circuit configured to drive the electric motor;
   a current sensor detecting a current flowing through the electric motor;
   a voltage sensor detecting a voltage input to the electric motor;
   a timer configured to count a period of use of the EPB system; and
   a controller configured to:
   determine a total energy consumption based on the current and voltage of the electric motor during a parking operation,
   determine whether a target current of a parking operation mode needs to be changed in response to the determined total energy consumption,
   determine the period of use from a product launch of the EPB system to the present from the period of use counted through the timer that counts individual or overall operating times of control modes comprising the parking operation mode and a parking operation release mode,
   in response to determining that the target current needs to be changed, change the target current based on the period of use and the number of times of operation of the EPB system, and
   control the electric motor in response to the changed target current.

2. The electric parking brake system of claim 1, wherein the controller is further configured to:
   compare the determined total energy consumption with a reference consumption, and
   determine that the target current of the parking operation mode needs to be changed in response to that the determined total energy consumption is higher than the reference consumption.

3. The electric parking brake system of claim 1, further comprising a counter configured to count the number of times of operation of the EPB system,
   wherein the controller is further configured to:
   determine the total number of times of operation from a product launch of the EPB system to the present from the number of times of operation counted through the counter, and change the target current based on the determined total number of times of operation.

4. The electric parking brake system of claim 1, wherein the controller is further configured to increase the target current of the parking operation mode as the period of use or the number of times of operation of the EPB system increases.

5. An electric parking brake (EPB) system comprising a motor actuator operated by an electric motor, comprising:
   a motor driving circuit configured to drive the electric motor;
   a current sensor configured to detect a current flowing through the electric motor;

a voltage sensor configured to detect a voltage input to the electric motor;
a counter configured to count the number of times of operation of the EPB system;
a timer configured to count a period of use of the EPB system; and
a controller configured to:
determine a total energy consumption based on the current and voltage of the electric motor during a parking operation,
determine whether a target current of a parking operation mode needs to be changed in response to the determined total energy consumption,
in response to determining that the target current needs to be changed, increase the target current based on the period of use and the total number of times of operation from a product launch of the EPB system to the present from the period of use counted through the timer that counts individual or overall operating times of control modes comprising the parking operation mode and a parking operation release mode, and
control the electric motor in response to the increased target current.

6. A method of controlling an electric parking brake (EPB) system including a motor actuator operated by an electric motor, the method comprising:

detecting a current and voltage of the electric motor during a parking operation;
determining a total energy consumption based on the detected current and voltage, and
comparing the determined total energy consumption with a reference consumption;
determining that the target current of a parking operation mode needs to be changed in response to determining that the total energy consumption is higher than the reference consumption as a result of the comparison;
increasing the target current based on a period of use counted through a timer that counts individual or overall operating times of control modes comprising the parking operation mode and a parking operation release mode, and the total number of times of operation from a product launch of the EPB system to the present in response to determining that the target current needs to be changed; and
controlling the electric motor in response to the increased target current.

7. The method of claim 6, wherein the increasing of the target current comprises increasing the target current as the total number of times of operation of the EPB system increases or the period of use of the EPB system increases.

* * * * *